United States Patent
Thomas et al.

(10) Patent No.: US 10,460,294 B1
(45) Date of Patent: Oct. 29, 2019

(54) DETECTION OF ERRORS IN TRANSACTION CHANNELS USING ELECTRONIC TRANSACTION MONITORING

(75) Inventors: Robert Scot Thomas, Monticello, MN (US); Alan W. Hecht, Chanhassen, MN (US); Ryan Lindstrom, Chandler, AZ (US)

(73) Assignee: Wells Fargo Bank, N.A., San Francisco, CA (US)

(*) Notice: Subject to any disclaimer, the term of this patent is extended or adjusted under 35 U.S.C. 154(b) by 2022 days.

(21) Appl. No.: 12/044,335

(22) Filed: Mar. 7, 2008

(51) Int. Cl.
   *G06Q 40/00* (2012.01)
   *G06Q 20/04* (2012.01)
   *G06Q 20/32* (2012.01)
   *G07F 7/08* (2006.01)
   *G07F 7/10* (2006.01)

(52) U.S. Cl.
   CPC ............ *G06Q 20/04* (2013.01); *G06Q 20/32* (2013.01); *G06Q 20/327* (2013.01); *G07F 7/0866* (2013.01); *G07F 7/1008* (2013.01)

(58) Field of Classification Search
   CPC ...... G06Q 20/04; G06Q 20/32; G06Q 20/322; G06Q 20/3223; G06Q 20/327; G06Q 20/346; G06Q 20/363; G06Q 20/4016; G06Q 40/025; G07F 7/0866; G07F 7/1008
   USPC .......................................................... 705/45
   See application file for complete search history.

(56) References Cited

U.S. PATENT DOCUMENTS

| | | | |
|---|---|---|---|
| 5,349,170 A | 9/1994 | Kern | |
| 5,488,671 A | 1/1996 | Kern | |
| 5,909,673 A * | 6/1999 | Gregory | G06Q 20/042 705/14.26 |
| 5,930,778 A * | 7/1999 | Geer | G06Q 20/042 235/379 |
| 5,940,844 A * | 8/1999 | Cahill | G06K 9/033 715/268 |
| 5,974,392 A * | 10/1999 | Endo | G06Q 10/06311 705/7.14 |
| 6,019,282 A | 2/2000 | Thompson et al. | |
| 6,125,196 A | 9/2000 | Carey et al. | |
| 7,167,580 B2 * | 1/2007 | Klein | G07D 11/30 382/112 |

(Continued)

OTHER PUBLICATIONS

Check Clearing House Consolidation Looms. (1997). Corporate EFT Report, 17(9), N/A. Retrieved from http://dialog.proquest.com/professional/docview/678249550?accountid=142257 on Jun. 17, 2019 (Year: 1997).*

(Continued)

*Primary Examiner* — Kito R Robinson
(74) *Attorney, Agent, or Firm* — Merchant & Gould P.C.

(57) ABSTRACT

Techniques of detecting errors on a transaction channel. As described herein, nodes that perform actions of a transaction channel automatically generate reception records that memorialize receptions by the nodes of transaction items that represent financial transactions. These reception records can be analyzed to determine whether a node that performs an action in the transaction channel failed to receive a transaction item within an expected time. If a node that performs an action in the transaction channel failed to receive a transaction item within the expected time, an error remediation process may be performed.

17 Claims, 8 Drawing Sheets

(56) References Cited

U.S. PATENT DOCUMENTS

| | | | | |
|---|---|---|---|---|
| 7,246,741 | B2* | 7/2007 | Cable | G06Q 20/042 235/379 |
| 7,330,835 | B2* | 2/2008 | Deggendorf | G06Q 20/10 705/35 |
| 7,344,064 | B2* | 3/2008 | Wilk | G06Q 20/04 235/379 |
| 7,379,959 | B2* | 5/2008 | Hinni | H04L 67/16 709/202 |
| 7,431,201 | B2* | 10/2008 | Brey | G06Q 10/08 235/375 |
| 7,606,762 | B1* | 10/2009 | Heit | G06Q 20/042 705/39 |
| 7,610,040 | B2* | 10/2009 | Cantini | G06Q 20/04 340/5.9 |
| 8,104,673 | B2* | 1/2012 | Cantley | G06Q 30/06 235/379 |
| 8,397,108 | B1* | 3/2013 | Vannatter | G06Q 10/00 714/23 |
| 2003/0208421 | A1 | 11/2003 | Vicknair et al. | |
| 2004/0153408 | A1* | 8/2004 | Jones | G06Q 20/042 705/43 |
| 2005/0071283 | A1* | 3/2005 | Randle | G06Q 20/04 705/75 |
| 2005/0108168 | A1* | 5/2005 | Halpin | G06Q 20/042 705/45 |
| 2007/0118747 | A1* | 5/2007 | Pintsov | G06Q 20/04 713/170 |
| 2007/0203778 | A1* | 8/2007 | Lowson | G06Q 10/06 705/7.14 |
| 2007/0288382 | A1* | 12/2007 | Narayanan | G06Q 20/04 705/45 |
| 2008/0097899 | A1* | 4/2008 | Jackson | G06Q 20/10 705/39 |
| 2008/0249951 | A1* | 10/2008 | Gilder | G06Q 20/04 705/76 |
| 2008/0262953 | A1* | 10/2008 | Anderson | G06Q 20/042 705/35 |
| 2011/0320358 | A1* | 12/2011 | Harris | G06Q 20/042 705/45 |

OTHER PUBLICATIONS

Herrera, R. (1989). Computerized check processing de minimis errors in check description on stop payment orders. Computer/Law Journal, 9(2), 205-21. Retrieved from http://dialog.proquest.com/professional/docview/824673801?accountid=142257 on Jun. 17, 2019 (Year: 1989).*

* cited by examiner

DETECTION OF ERRORS IN TRANSACTION CHANNELS USING ELECTRONIC TRANSACTION MONITORING

BACKGROUND

Banks and other financial institutions hold accounts for customers. For instance, a bank may hold a checking account for an individual. When a customer wants to deposit funds into an account held by a bank, the customer may go to a bank branch and present a check to a teller. In general, a check is a piece of paper that represents an obligation by a first entity to pay a specific amount of money to a second entity.

After the customer presents the check to the teller, the check may be processed through one or more conventional check deposit transaction channels before funds are actually deposited into the customer's account. A transaction channel is a series of actions performed to process a type of transaction item that represents a financial transaction. Although different banks may perform different transaction channels, a common first action in a check deposit transaction channel is for the teller to enter the information on the check into a computer database. Next, the teller may place the check into an appropriate bin. Subsequently, an armored car may transport all checks collected during a day to a banking operations center. When the armored car arrives at the banking operations center, employees at the banking operations center may create a digital version of the check and then transmit the digital version of the check to a check processing authority that coordinates check transactions between banks. In the United States, the Federal Reserve System acts as a check processing authority that coordinates check transactions between banks. Ultimately, funds are transferred into the account of the customer. After the employees at the banking operations center create the digital version of the check, the employees at the banking operations center may store the check into an archive.

Errors may occur when the actions of the conventional check deposit transaction channel are being performed on a check. For instance, the teller may enter incorrect information into the computer database or may place the check into the wrong bin. In another instance, the employees at the banking operation center may misplace the check before creating the digital version of the check. Such errors may have serious economic consequences. For instance, money may not be deposited in a bank account when the bank loses a check. In another instance, an error could result in money being deposited in a bank account multiple times (and withdrawn from another bank account multiple times). In all of these cases, it may be expensive and time consuming for the bank to identify and correct errors in the conventional check deposit process.

In addition to this conventional check deposit transaction channel, banks may establish many other transaction channels. For instance, a bank may operate automated teller machines (ATMs) that accept deposits. In this instance, the bank may establish a transaction channel to process checks deposited in ATMs.

SUMMARY

In general, this disclosure describes techniques of detecting errors on a transaction channel. As described herein, nodes that perform actions of a transaction channel automatically generate reception records that memorialize receptions by the nodes of transaction items that represent financial transactions. These reception records can be analyzed to determine whether a node that performs an action in the transaction channel failed to receive a transaction item within an expected time. If a node that performs an action in the transaction channel failed to receive a transaction item within the expected time, an error remediation process may be performed.

For example, a bank may perform a series of actions on a transaction item in order to process a personal check. This series of actions is a "transaction channel." In this example, a set of devices and/or people may perform the actions in the transaction channel. These devices and/or people are referred to as "nodes." Each time one of these nodes receives the personal check, the node generates a reception record that memorializes the fact that the node received the personal check. An automatic monitoring system may analyze these records to determine whether one of the nodes failed to receive the personal check within an expected amount of time. If one of the nodes failed to receive the personal check within this expected amount of time, it may be assumed that an error has occurred. Consequently, the monitoring system may automatically initiate a remediation process that attempts to remediate the error.

The techniques of this disclosure may be implemented in many ways. For example, the techniques of this disclosure may be implemented as a method that comprises generating, at a plurality of nodes that perform actions in a transaction channel, reception records that memorialize receptions by the nodes of transaction items that represent financial transactions. The method also comprises automatically analyzing the reception records to determine whether a given node that performs one of the actions in the transaction channel failed to receive a target transaction item within an expected time, wherein an error has occurred when the given node failed to receive the target transaction item within the expected time. The target transaction item is one of the transaction items. In addition, the method comprises performing a remediation process that attempts to remediate the error when the given node failed to receive the target transaction item within the expected time.

In another example, the techniques of this disclosure may be implemented as a computer-readable medium that comprises instructions that cause a plurality of nodes that perform actions in a transaction channel to automatically generate reception records that memorialize receptions by the nodes of transaction items that represent financial transactions. The computer-readable medium also comprises instructions that cause a monitoring system to automatically analyze the reception records to determine whether a given node that performs one of the actions in the transaction channel failed to receive a target transaction item within an expected time, wherein an error has occurred when the given node failed to receive the target transaction item within the expected time. The target transaction item is one of the transaction items. In addition, the computer-readable medium comprises instructions that cause a remediation system to perform a remediation process that attempts to remediate the error when the given node failed to receive the target transaction item within the expected time.

In another example, the techniques of this disclosure may be implemented as a system that comprises a financial institution that identifies a transaction channel that comprises a sequence of actions required to process transaction items that represent financial transactions belonging to a type of financial transaction. The system also comprises a plurality of nodes, each of which receives transaction items belonging to the type of financial transaction, generates a reception record that memorializes the reception of the transaction item upon receiving the transaction item, stores the reception record into a database, performs at least one of the actions of the transaction channel, and forwards the transaction item to a one of the nodes that performs a next one of the actions of the transaction channel. In addition, the system comprises a final node that receives the transaction item from a node in the plurality of nodes and performs at least one of the actions of the transaction channel. Moreover, the system comprises a monitoring system that automatically analyzes the reception records in the database to determine whether a given node failed to receive a target transaction item within an expected time. An error has occurred when the given node failed to receive the target transaction item within the expected time. The target transaction item belongs to the type of transaction items. The given node is a node in the plurality of nodes or the final node. The system also comprises a remediation system that performs a remediation process that attempts to remediate the error when the given node failed to receive the target transaction item within the expected time.

The details of one or more embodiments are set forth in the accompanying drawings and the description below. Other features, objects, and advantages will be apparent from the description, drawings, and claims.

DETAILED DESCRIPTION

Figure 1:
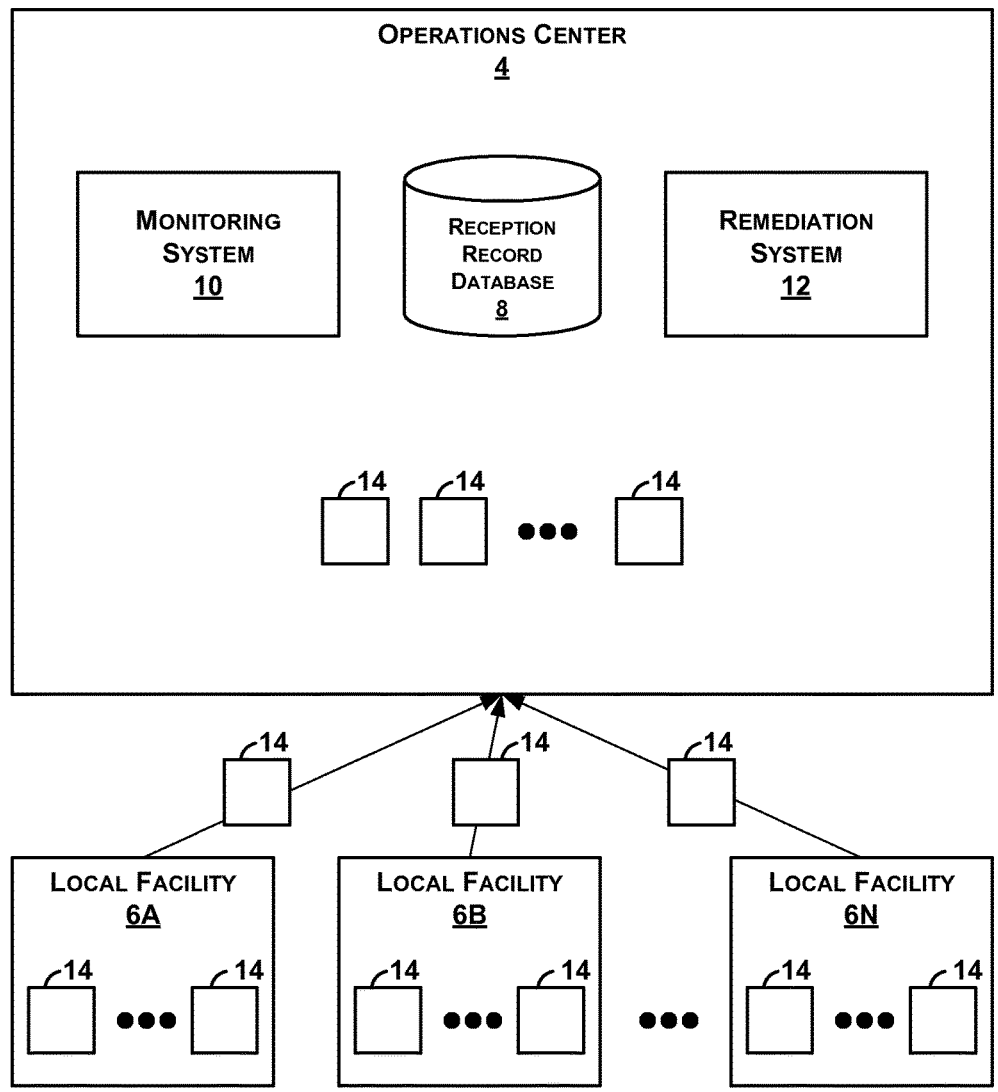
FIG. 1 is a block diagram illustrating an example system in which a financial institution uses automatic transaction monitoring to detect missing financial transactions.

FIG. 1 is a block diagram illustrating an example system 2 in which a financial institution uses automatic transaction monitoring to detect errors on a transaction channel. FIG. 1 is provided for purposes of explanation only and is not intended to represent a sole manner of implementing the techniques described in this disclosure or required by the claims.

System 2 includes an operations center 4. Operations center 4 may constitute one or more physical facilities that process transaction items. As used in this disclosure, a "transaction item" is an item that represents a financial transaction. A "financial transaction" is a change in the financial status of two or more economic entities. As used in this disclosure, economic entities may include individuals, businesses, governments, non-profit organizations, inter-governmental organizations, and other types of entities that have financial statuses. Example transaction items include personal checks, business checks, traveler's checks, cashier's checks, money orders, digital versions of checks, electronic objects/data structures, and other items that represent financial transactions.

As illustrated in the example of FIG. 1, system 2 includes a set of local facilities 6A through 6N (collectively, "local facilities 6"). Local facilities 6 may represent any facility at which a customer may initiate a financial transaction. Local facilities 6 may assume variety of different forms. For instance, one or more of local facilities 6 may be a bank branch, an automated teller machine, a private enterprise, a desktop deposit system for business or home use, a store, a kiosk, a cash vault, or another type of facility. One or more of local facilities 6 may be owned or operated by the financial institution and one or more of local facilities 6 may be owned or operated by other entities. For instance, a retail business (i.e., a local facility) may submit checks received from customers directly to operations center 4.

A financial institution that operates operations center 4 may identify a set of transaction channels. A "transaction channel" is a sequence of actions that are performed on a transaction item belonging to a type of financial in order to execute the transaction represented by the transaction item. For example, a transaction channel may including one or more of the following actions:

1) Receive personal check at one of local facilities 6.
2) Enter information on the personal check into a database.
3) Transport the personal check to operations center 4.
4) Create digital version of the personal check at operations center 4.
5) Submit the digital version of the personal check to a check processing authority.
6) Temporarily archive the personal check at operations center 4.
7) Destroy personal check after one weeks.

Each action in a transaction channel is performed by a node. As illustrated in the example of FIG. 1, nodes 14 may be located in local facilities 6, in operations center 4, on pathways between local facilities 6 and operations center 4, or other locations. As used in this disclosure, a "node" is any person, organization, or machine that performs an action in a transaction channel. Nodes 14 may perform more than one action in a transaction channel. For example, in the example transaction channel in the previous paragraph, a teller may perform the action of receiving the personal check at the bank branch and the action of entering information on the personal check into the database, a secure transportation company may perform the action of transporting the personal check to an operations center, a document imaging machine at the operations center may perform the action of creating the digital version of the check, a transaction management device may perform the action of submitting the digital version of the personal check to the check processing authority, and an archives department at the operations center may perform the action of temporarily archiving the personal check and the action of destroying the personal check after two weeks.

In order for each of nodes 14 to perform the actions in a transaction channel on a transaction item, the transaction item is forwarded between nodes 14. Continuing the example of the previous paragraph, the teller may, for example, forward the personal check to the secure transportation company when an employee of the secure transportation company picks up the personal checks collected by the bank branch.

When one of nodes 14 receives a transaction item, the node generates a reception record that memorializes the reception by the node of the transaction item. Different types of nodes may generate reception records in different ways. For example, a node that is a person may generate a reception record by manually entering data into a device. In another example, a node that is a network device may execute a program that causes the network device to generate a reception record.

The reception record may include several pieces of information. For example, a node that receives a transaction item in a transaction channel may generate a reception record that indicates a transaction item identifier, a node identifier, a timestamp, a transaction channel identifier, and a transaction expiration time. In this example, the transaction item identifier may be a string of symbols that uniquely identifies the transaction item, the node identifier may be a string of symbols that uniquely identifies the node, the timestamp may be a string of symbols that identifies the time when the node received the transaction item, the transaction channel identifier may be a string of symbols that identifies the transaction channel through which the transaction item is being processed, and the transaction expiration time may indicate an expiration time for the reception record.

After a node generates a reception record, the node may store the reception record into a reception record database 8. Reception record database 8 may be a relational database, an associative database, an object-oriented database, an online analytical processing (OLAP) database, or another type of database. In implementations in which reception record database 8 is a relational database, reception record database 8 may include a set of tables that contain different types of data. In such implementations, one or more pieces of information in a reception record may be implied by the storage of some pieces of information in the reception record in certain ones of the tables of the reception record database. For instance, reception record database 8 may include a table that lists all reception records generated by a certain node. In this instance, a reception record may not need to explicitly specify a node identifier because the node identifier may be implied by the fact that the reception record is in a table that lists all reception records generated by the node.

After a node stores a reception record into reception record database 8, the node may perform one or more actions in a transaction channel on the transaction item. For instance, after an image capture device (i.e., a node) stores a reception record that memorializes the reception of a check (i.e., a transaction item), the image capture device may capture digital images of the check and then use the digital images of the check to generate a digital version of the check. As used in this disclosure, a "digital version of a check" is a set of digital information that comprises a digital image of the front side of the check, a digital image of the reverse side of the check, and appropriate metadata that describes the check. For instance, in the context of the American Check Clearing for the 21$^{st}$ Century Act ("Check 21 Act"), "truncated checks" are "digital versions of checks."

Once the node has performed the actions in the transaction channel on the transaction item, the transaction item may be forwarded to another one of nodes 14 that performs subsequent actions in the transaction channel on the transaction item. In this way, all of the actions in the transaction channel are performed on the transaction item. The transaction item may be forwarded in a variety of ways. In a first example, a first one of nodes 14 may automatically forward the transaction item to a second one of nodes 14 through a computer network such as the Internet. In a second example, a first one of nodes 14 may automatically forward the transaction item to a second one of nodes 14 via a telephone network by placing a voice call or sending a fax message. In a third example, a transaction item may be forwarded from a first one of nodes 14 to a second one of nodes 14 by a person or machine that physically moves the transaction item from the first one of nodes 14 to the second one of nodes 14.

Certain times may be expected to pass between a time when a first one of nodes 14 receives a transaction item and a time when a second one of nodes 14 receives the transaction item. For example, a teller may perform a first action in a transaction channel on a check and an image capture device may perform a second action in the transaction channel on the check. In this example, two hours may be expected to pass between a time when the teller received the check and a time when the image capture device received the check.

If the expected amount of time passes after a time when the first node receives the transaction item without the second node receiving the transaction item, an error may have occurred. In other words, when a transaction item has not reached a node that performs a next action in a transaction channel within an expected amount of time, it is likely that an error has occurred. For example, a first one of nodes 14 that performs a first action in a transaction channel may have received a transaction item at 2:30 p.m. In this example, it may be expected that a second one of nodes 14 that performs a second action in the transaction channel should receive the transaction item within two hours of the reception of the transaction item by the first one of nodes 14. Hence, in this example, if the current time is 5:00 p.m. and the second one of nodes 14 has not received the transaction item, it may be suspected that an error has occurred.

As illustrated in the example of FIG. 1, operations center 4 includes a monitoring system 10. Monitoring system 10 may comprise one or more computers. For example, monitoring system 10 may include one or more personal computers, mainframe computers, servers, or other types of devices.

Monitoring system 10 automatically analyzes the reception records in reception record database 8 to determine whether ones of nodes 14 along the transaction channels failed to receive transaction items within expected times. Different implementations of monitoring system 10 may perform this analysis in different ways. In one example implementation, monitoring system 10 may identify all chains of reception records among reception records generated in the past twenty-four hours. A "chain of reception records" is a set of reception records that specify a common transaction item identifier and a common transaction channel. For instance, a chain of reception records may be a set of reception records that includes a first reception record that indicates that a teller received a check at 10:30 a.m. on Jan. 15, 2008, a second reception record that indicates that a secure transportation company received the check at 5:30 p.m. on Jan. 15, 2008, and a third reception record that indicates that a document intake department at operations center 6 received the check at 7:30 p.m. on Jan. 15, 2008. After identifying a chain of reception records, monitoring system 10 may identify the most-recently generated reception record in the chain of reception records. Monitoring system 10 may then determine whether the current time is after an expiration time specified by the most-recently generated reception record in the chain of reception records. In this disclosure, when the current time is later than the expiration time specified by the most-recently generated reception record in a chain of reception records, the chain of reception records is referred to as an "expired chain of reception records."

Monitoring system 10 may perform this analysis on a periodic basis or a continual basis. In a first example, monitoring system 10 may perform this analysis on a daily or an hourly basis. In a second example, monitoring system 10 may associate a reception record with a chain of reception records when the reception record is stored into reception record database 8. Furthermore, in this second example, monitoring system 10 may maintain a set of counter objects that alert monitoring system 10 when the current time is after an expiration time of a most-recently generated reception record in a chain of reception records. In this second example, monitoring system 10 effectively performs the analysis on a continual basis. Because of the relative frequency at which monitoring system 10 performs this analysis, monitoring system 10 may effectively detect errors in real-time. That is, monitoring system 10 may be able to detect errors as soon as or a short time after a node that is supposed to perform a next action in a transaction channel fails to receive a transaction item within an expected time.

When monitoring system 10 determines that a given one of nodes 14 that performs an action in a transaction channel failed to receive a transaction item within an expected time, monitoring system 10 may automatically attempt to identify a reason why the given node failed to receive the transaction item. In a first example, monitoring system 10 may attempt to determine whether the given node failed to receive the transaction item because of a "double post" error. A "double post" error occurs when a node erroneously receives a transaction item twice. When a node erroneously receives a single transaction item twice, the node generates and stores two separate reception records. In some cases, the node may receive the transaction item twice on different days.

In a second example, monitoring system 10 may attempt to determine whether the given node failed to receive the transaction item because of a "channel" error. A "channel" error occurs when a transaction item that is being processed in a first transaction channel is erroneously routed into a second transaction channel, as described further below. For instance, a clerk may receive a personal check from a customer, generate a reception record for the receipt of the personal check, but then place the personal check in a bin associated with traveler's checks. In this instance, the personal check may be processed in a transaction channel associated with traveler's checks instead of a transaction channel associated with personal checks. Consequently, a node that performs a next action in the personal check transaction channel does not receive the personal check and monitoring system 10 determines that this node failed to receive the personal check within an expected time indicated by the reception record generated by the teller.

As illustrated in the example of FIG. 1, operations center 4 includes a remediation system 12. Remediation system 12 may include one or more computers and/or one or more people. Computers in remediation system 12 may be personal computers, servers, mainframe computers, workstations, handheld devices, laptop computers, and other types of devices. People in remediation system 12 may, for instance, be employees or contractors of the financial institution.

When monitoring system 10 determines that a given node that performs an action in a transaction channel failed to receive a transaction item within an expected time, monitoring system 10 may instruct remediation system 12 to perform a remediation process that attempts to remediate any problems caused by the failure of the given node to receive the transaction item within the expected time. As described below, remediation system 12 may perform different operations depending on the type of error. For instance, remediation system 12 may perform a first operation when monitoring system 10 determines that a transaction item has been received twice by a single node. In another instance, remediation system 12 may perform a second operation when monitoring system 10 determines that a transaction item has been placed into a different transaction channel. In a third instance, remediation system 12 may perform a third operation when monitoring system 10 determines that a transaction item is missing.

Figure 2:
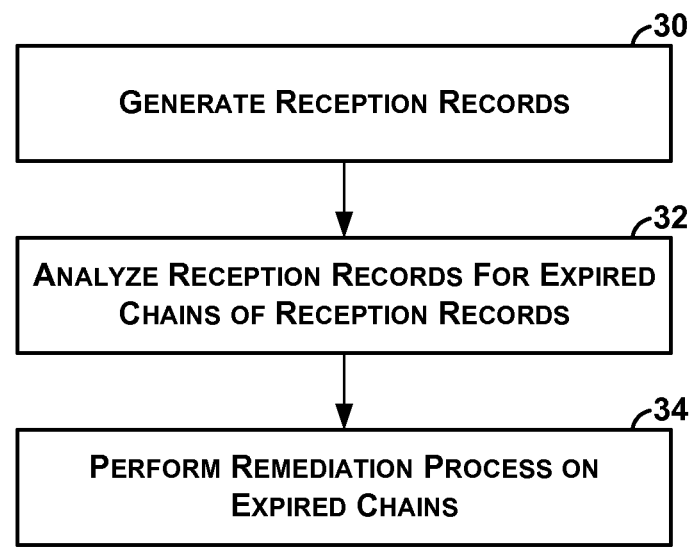
FIG. 2 is a flowchart illustrating an example high-level operation of the system.

FIG. 2 is a flowchart illustrating an example high-level operation of system 2. As illustrated in the example of FIG. 2, ones of nodes 14 that perform actions in transaction channels generate reception records that memorialize receptions by the nodes of transaction items (30). This disclosure describes an example operation that nodes may perform with regard to FIG. 5, below.

After the nodes generate the reception records, monitoring system 10 may automatically analyze the reception records for expired chains of reception records (32). As discussed above, a chain of reception records has expired when the current time is later than an expiration time associated with a most-recently generated reception record in the chain. This disclosure describes an example process to analyze the reception records for expired chains of reception records with regard to FIG. 4 and FIG. 6, below.

Next, remediation system 12 performs a remediation process on the expired chains of reception records (34), as described further below in reference to FIG. 7.

Figure 3:
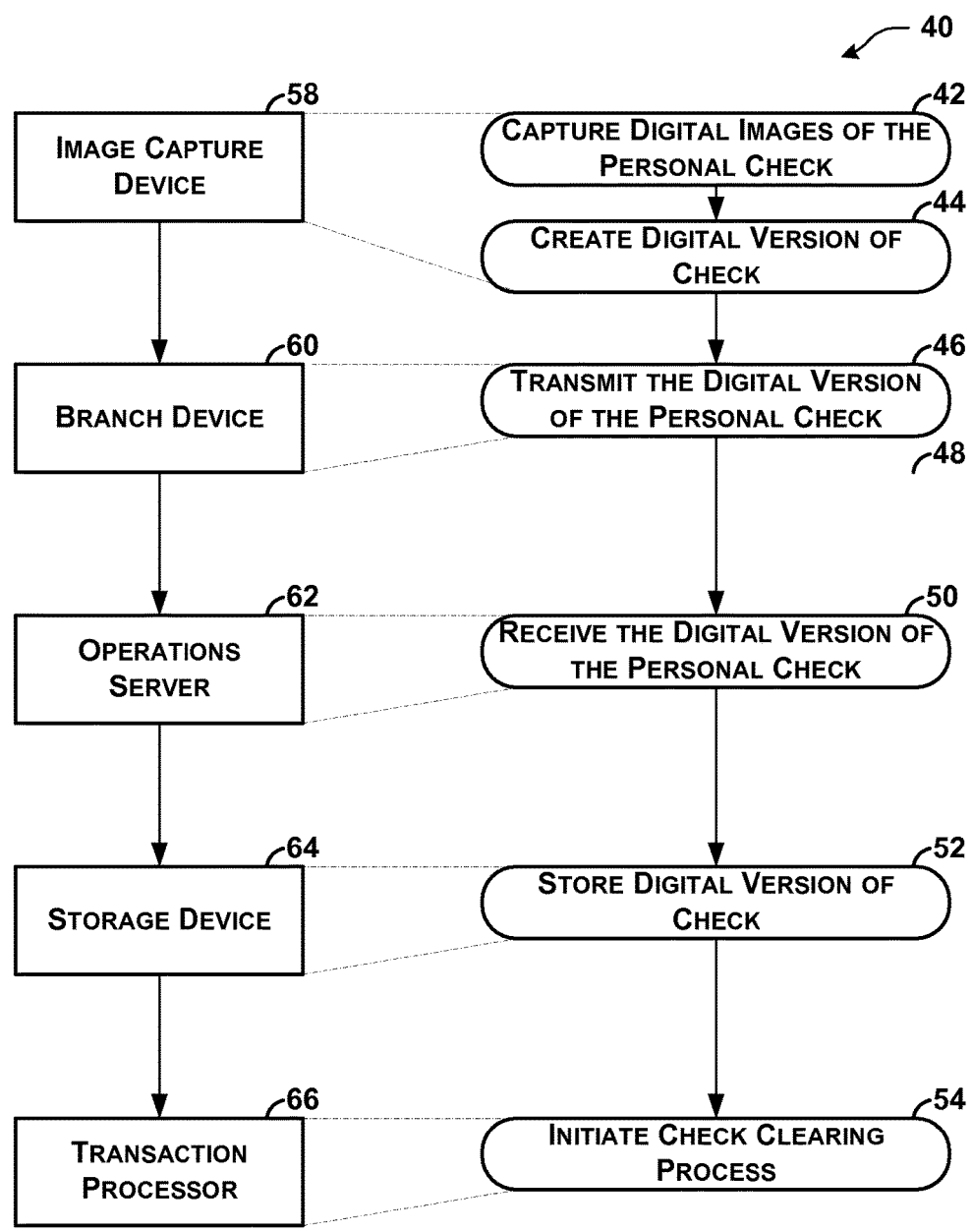
FIG. 3 is a block diagram illustrating an example transaction channel.

FIG. 3 is a block diagram illustrating an example transaction channel 40. As illustrated in the example of FIG. 3, transaction channel 40 includes the actions of:
1) Capture digital images of a personal check (42).
2) Create a digital version of the personal check (44).
3) Transmit the digital version of the personal check to an operations server at the operations center (46).
4) Receive the digital version of the personal check at the operations server at the operations center (48).
5) Store the digital version of the personal check in a database (50)
6) Initiate an automated check clearing process using the digital version of the personal check (52).

Note that transaction channel 40 performs actions to create and process a digital version of a personal check. For this reason, transaction item processed by transaction channel 40 is the digital version of the personal check. Note that the personal check (i.e., a paper document) may be a separate transaction item. In this example, different transaction item identifiers may be assigned to the digital version of the personal check and the paper personal check.

Furthermore, as illustrated in the example of FIG. 3, a teller 58 performs the action of receiving the personal check (42) and the action of placing the personal check in the personal check bin (44). An image capture device 60 performs the action of capturing digital images of the personal check (46) and the action of creating a digital version of the personal check (48). A branch device 62 performs the action of transmitting the digital version of the personal check to an operations server 64 at the operations center (50). Operations server 64 performs the action of receiving the digital version of the personal check (52). A storage device 66 performs the action of storing the digital version of the personal check (54). Lastly, a transaction processor 68 performs the action of initiating the automated check clearing process using the digital version of the personal check (56).

Figure 4:
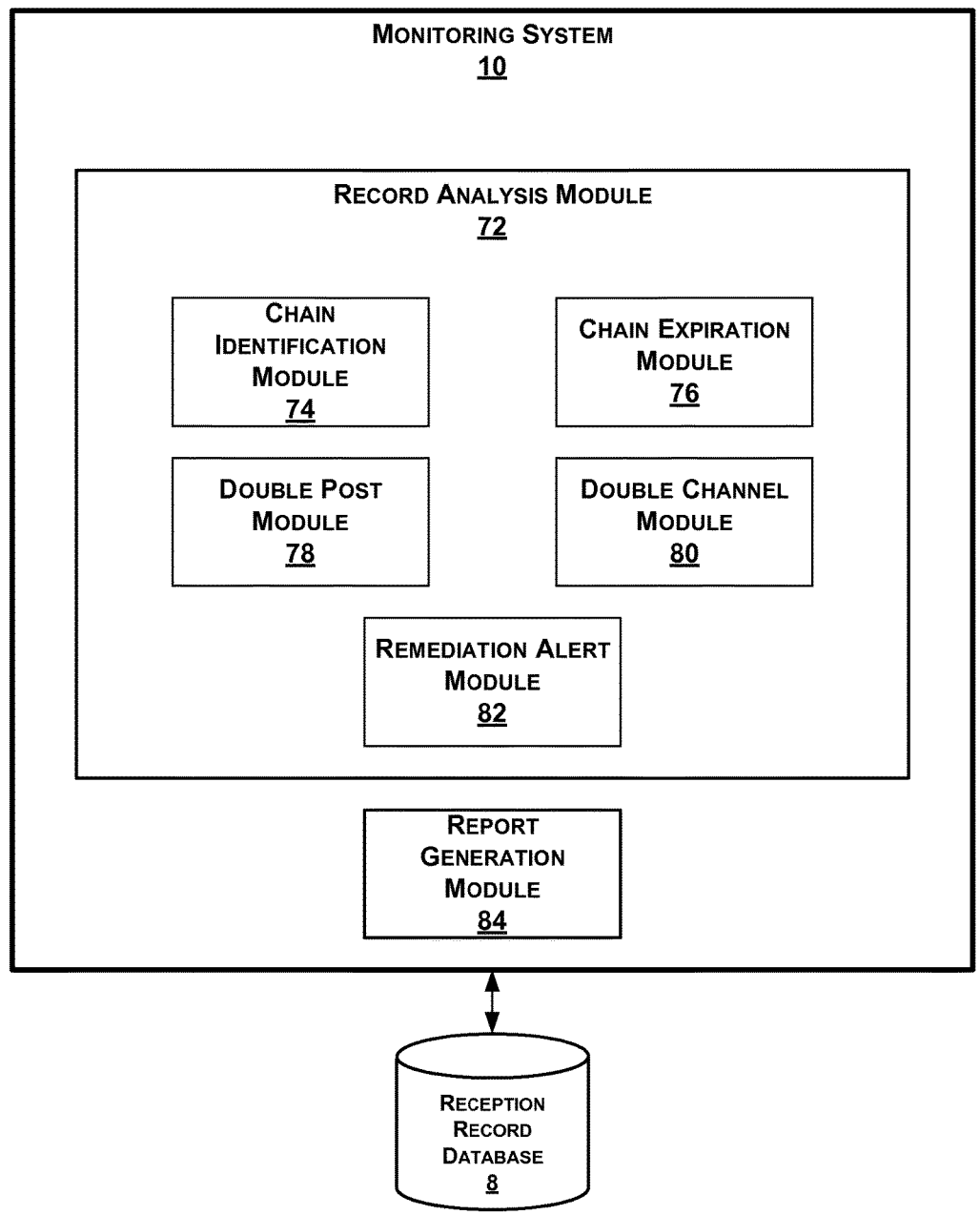
FIG. 4 is a block diagram illustrating example details of a monitoring device.

FIG. 4 is a block diagram illustrating exemplary details of monitoring system 10. The details in FIG. 4 are provided for explanatory purposes and are not intended to illustrate a sole way of implementing monitoring system 10.

As illustrated in the example of FIG. 4, monitoring system 10 interacts with reception record database 8. As discussed above, reception record database 8 stores reception records generated by nodes 14. Reception record database 8 may be constituted from a variety of different types of database. For instance, reception record database 8 may be a relational database, an associative database, an object-oriented database, a file system, a text file, or another type of data storage structure. Moreover, reception record database 8 may be distributed among a plurality of physically or logically separate databases. For instance, one portion of reception record database 8 may be located in a database at a first operations center in Ohio and another portion of reception record database 8 may be located in a database at a second operations center in Minnesota.

Reception record database 8 may be configured to store reception records permanently or for limited periods of time. For instance, reception record database 8 may be configured to store all reception records indefinitely. In another instance, reception record database 8 may be configured to store reception records for no more than seven days. Storing reception records for limited periods of time may help to control the size of reception record database 8.

Furthermore, as illustrated in the example of FIG. 4, monitoring system 10 includes a record analysis module 72. In general terms, record analysis module 72 analyzes the reception records stored in reception record database 8 for errors. In other words, record analysis module 72 analyzes the reception records stored in reception record database 8 to determine whether a given node along a transaction channel failed to receive a transaction item within an expected time.

In the example of FIG. 4, record analysis module 72 includes several modules that, in conjunction, analyze the reception records stored in reception record database 8 for errors. For instance, record analysis module 72 includes a chain identification module 74 that identifies chains of reception records in reception record database 8. As discussed above, a "chain of reception records" is a set of reception records that memorialize receipt by different nodes that perform actions in a transaction channel on the same transaction item.

Furthermore, as illustrated in the example of FIG. 4, record analysis module 72 includes a chain expiration module 76 that determines whether each of the identified chains of reception records has "expired." A chain of reception records has expired when the current time is later than an expiration time associated with a most-recently generated reception record in the chain.

Record analysis module 72 also includes a double-post module 78 that automatically determines whether a chain of reception records has expired because one or more of the reception records in the chain is a duplicate of a reception record generated on a previous day. In addition, record analysis module 72 includes a double-channel module 80 that automatically determines whether a chain of reception records has expired because one or more of the reception records in the one or more of the reception records in the chain are a duplicate of a reception record associated with a different transaction channel. Moreover, record analysis module 72 includes a remediation alert module 82 that alerts remediation system 12 to expired chains of reception records and potential reasons why the chains may be expired. This disclosure explains the operations of chain identification module 74, chain expiration module 76, double-post module 78, double-channel module 80, and remediation alert module 82 in detail with regard to FIG. 6, below.

In addition to record analysis module 72, monitoring system 10 may include a report generation module 84. Report generation module 84 creates reports that compare results for processed transactions. For example, report generation module 84 may generate a report that indicates that 99% of reception record chains do not expire. In another example, report generation module 84 may generate a report that indicates that 25% of expired chains of reception records are caused by duplicate posts on separate days. These reports may be reviewed by a variety of different audiences including operations support staff, executives, shareholders, and other audiences.

Figure 5:
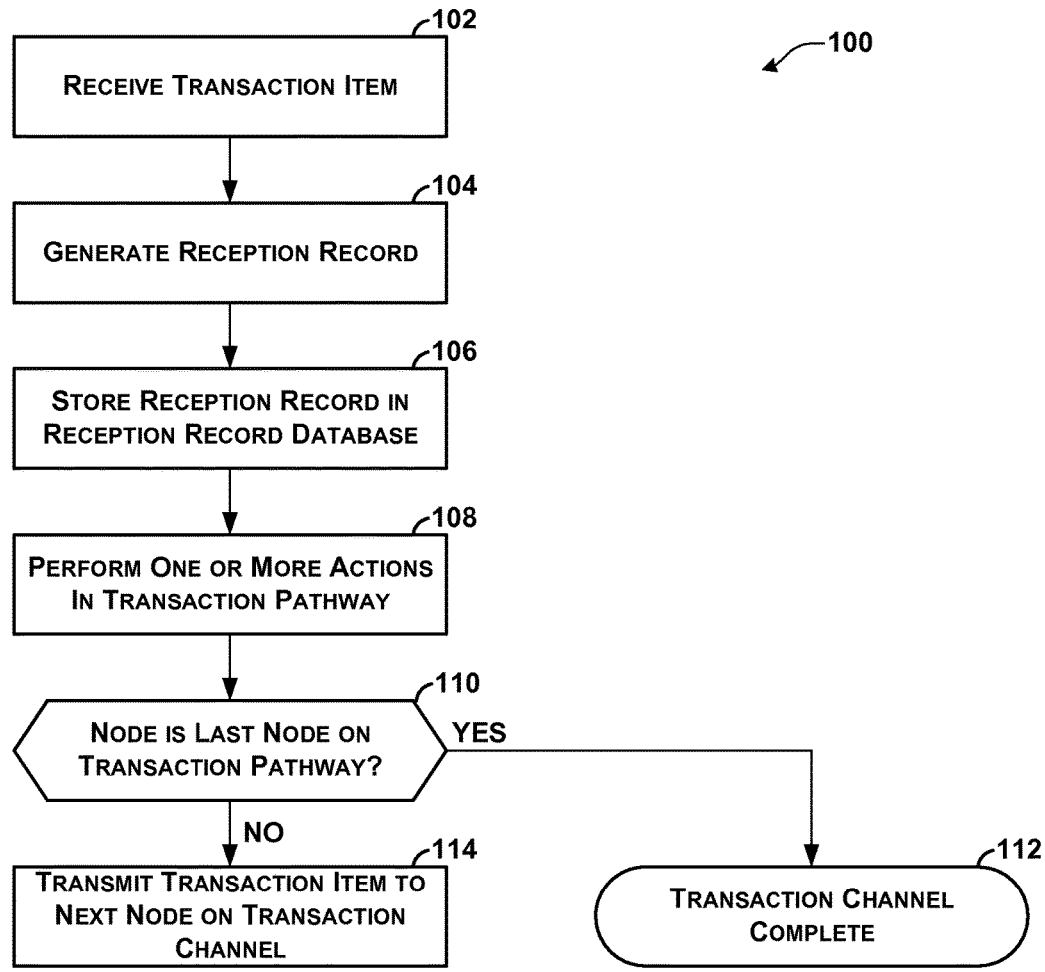
FIG. 5 is a flowchart illustrating an example operation of a node.

FIG. 5 is a flowchart illustrating an example operation 100 of a node that performs an action in a transaction channel. As illustrated in the example of FIG. 5, operation 100 may start when the node receives a transaction item (102). Depending on the nature of the node and the transaction item, the node may receive the transaction item in a variety of different ways. For instance, when the node is a teller and the transaction item is a check, the node (i.e., the teller) may receive the transaction item (i.e., the check) by physically receiving the check from a customer. In another instance, when the node is a network device and the transaction item is a digital version of a check, the node (i.e., the network device) may receive the transaction item (i.e., the digital version of the check) by receiving the digital version of the check through a computer network.

After the node receives the transaction item, the node may generate a reception record that memorializes the reception by the node of the transaction item (104). As discussed above, a reception record may, in one example, memorialize a reception by a node of a transaction item by specifying a transaction identifier, a time at which the node received the transaction item, a node identifier, a type identifier, and other information. Furthermore, the node may generate the reception record in a variety of ways. For example, the node may generate the reception record by generating a database query to store information that memorializes the reception by the node of the transaction item.

Once the node has generated the reception record, the node may store the reception record in reception record database 8 (106). The node may store the reception record in reception record database 8 in a variety of ways. For example, the node may store the reception record into reception record database 8 as soon as the reception record is generated. In another example, the node may store reception records into reception record database 8 on a periodic basis. In this example, the node may collect all reception records generated in one hour and store all of the collected reception records into reception record database 8 as a batch.

The node may then perform one or more actions in the transaction channel on the transaction item (108). For instance, if the node is a teller and the transaction item is a check, the node (i.e., the teller) may add the check to a check collection bin.

After the node performs the actions on the transaction item, the node may determine whether the node has performed a last action in the transaction channel (110). If the node has performed the last action in the transaction channel ("YES" of 110), the transaction channel is complete for the transaction item (112). On the other hand, if the node has not performed the last action in the transaction channel ("NO" of 110), the node may transmit the transaction item to a node that performs a next action in the transaction channel (114). The node may transmit the transaction item to a node that performs a next action on the transaction channel in a variety of ways depending on the nature of the node, the nature of the transaction item, and the nature of the node that performs the next action in the transaction channel.

Figure 6:
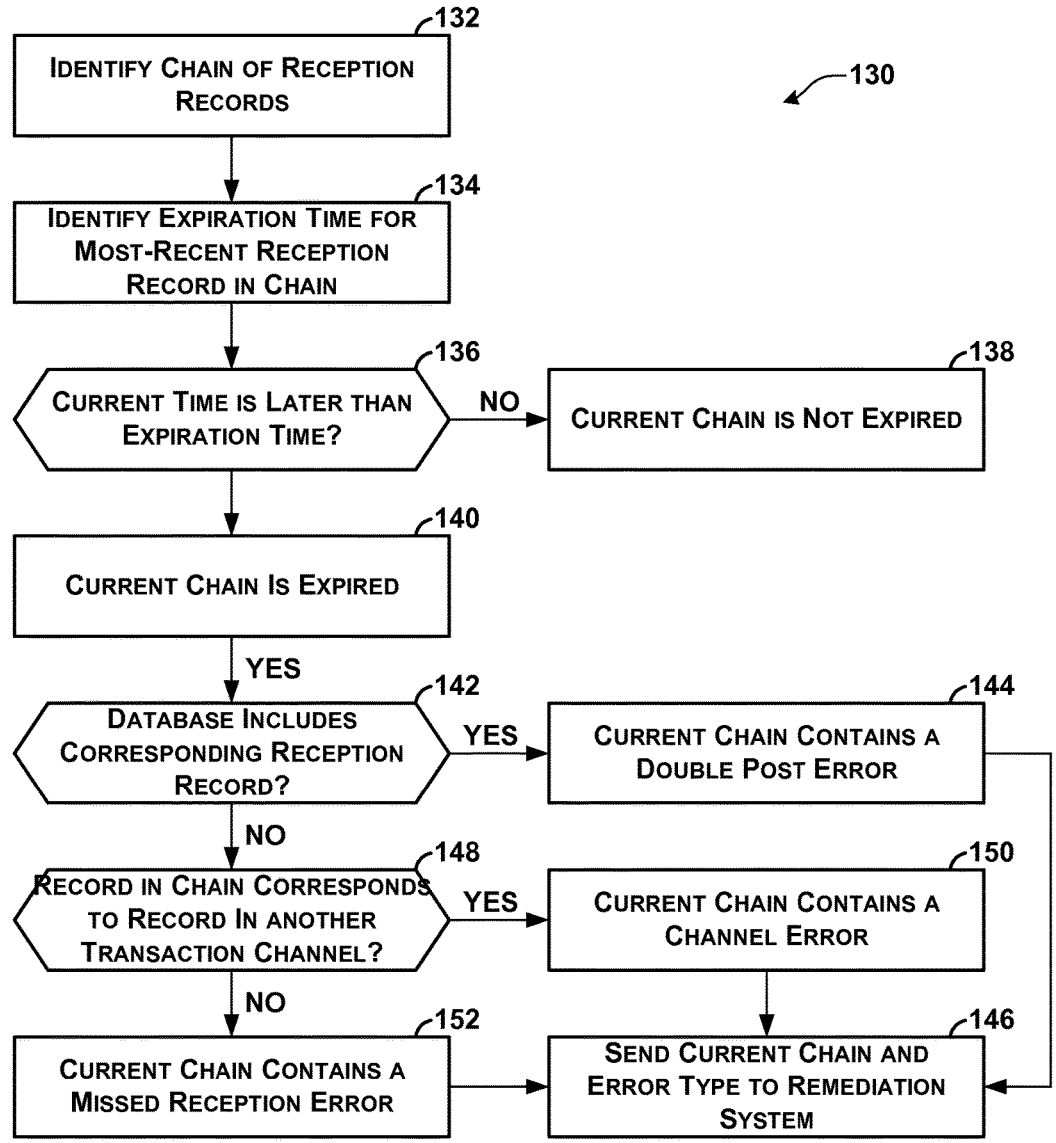
FIG. 6 is a flowchart illustrating an example operation of a monitoring system.

FIG. 6 is a flowchart illustrating an example operation 130 of record analysis module 72 (FIG. 4). As illustrated in the example of FIG. 6, operation 130 may begin when chain identification module 74 in record analysis module 72 identifies a chain of reception records among the current day's reception records (132). For ease of explanation, this disclosure refers to the identified chain of reception records in the context of FIG. 6 as the "current chain." The current day's reception records are those reception records in reception record database 8 that were generated within twenty-four hours of the current time.

Chain identification module 74 may identify a chain of reception records in a variety of ways. For example, chain identification module 74 may identify a chain of reception records by sending a query to reception record database 8 for all reception records generated in the last twenty-four hours. In response to this query, reception record database 8 returns the set of reception records generated in the last twenty-four hours. Upon receiving the set of reception records, chain identification module 74 may randomly remove a reception record from the set of reception records. Furthermore, in this example, chain identification module 74 may remove from the set of reception records all reception records that specify the same transaction identifier as the randomly removed reception record and the same transaction channels as the randomly removed reception record. These reception records, along with the randomly removed reception record, may, in this example, constitute a chain of reception records. In this example, chain identification module 74 may repeat this process of removing reception records from the set of reception records until the set of reception records is empty. In this way, chain identification module 74 may identify all chains of reception records that include reception records that were generated in the last twenty-four hours.

Furthermore, in operation 130, chain expiration module 76 identifies an expiration time for the most-recently generated reception record in the current chain (134). In one example implementation, each reception record specifies the expiration time of the reception record. In this example implementation, chain expiration module 76 may identify an expiration time for the most-recently generated reception record in the current chain by reading the expiration time of the most-recently generated reception record in the current chain.

After identifying an expiration time for the most-recently generated reception record in the current chain, chain expiration module 76 may determine whether the current time is later than the expiration time for the most-recently generated reception record in the current chain (136). If the current time is not later than the expiration time for the most-recently generated reception record in the current chain ("NO" of 136), chain expiration module 76 may determine that the current chain is not expired (138). On the other hand, if the current time is later than the expiration time for the most-recently generated reception record in the current chain ("YES" of 136), chain expiration module 76 may determine that the current chain is expired (140).

When chain expiration module 76 determines that the current chain is expired, double-post module 78 may determine whether the previous day's reception records in reception record database 8 include a reception record that corresponds to a reception record in the current chain (142). The previous day's reception records are those reception records in reception record database 8 that were generated between forty-eight and twenty-four hours prior to the current time. As used in this disclosure, a first reception record may "correspond" to a second reception record when the first reception record and the second reception record memorialize the reception of a common transaction item.

If double-post module 78 determines that the previous day's reception records include a reception record that corresponds to a reception record in the current chain ("YES" of 142), double-post module 78 may determine that the current chain contains a double-post error (144). As discussed above, double post error occurs when a node erroneously receives a transaction item twice. Double post errors may happen for a variety of reasons. For instance, a double post error may occur when two digital versions of a check are created from one paper version of the check. After double-post module 78 determines that the current chain contains a double-post error, remediation alert module 82 may send a message to remediation system 12 that includes the current chain and a notification that the current chain includes a double-post error (146).

Otherwise, if double-post module 78 determines that the previous day's reception records do not include a reception record that corresponds to a reception record in the current chain ("NO" of 142), double channel module 80 determines whether a reception record in the current chain corresponds to a reception record in reception record database 8 that is associated with a different transaction channel (148). Double channel module 80 may determine whether a reception record in the current chain corresponds to a reception record that is associated with a different transaction channel by querying reception record database 8 for all reception records that specify the transaction item identifier specified by the most-recently generated reception record and that specify a transaction channel other than the transaction channel of the current chain. If reception record database 8 returns any records in response to this query, double channel module 80 may determine that the returned records correspond to a record in the current chain.

If double channel module 80 determines that a reception record in the current chain corresponds to a reception record in reception record database 8 that is associated with a different transaction channel ("YES" of 148), double channel module 80 may determine that the current chain includes a channel error (150). After double channel module 80 determines that the current chain includes a channel error, remediation alert module 82 may send a message to remediation system 12 that includes the current chain and a notification that the current chain includes a channel error (146).

On the other hand, if double channel module 80 determines that a reception record in the current chain does not correspond to a reception record in reception record database 8 that is associated with a different transaction channel ("NO" of 148), double channel module 80 determines that the current chain includes a miscellaneous error (152). As used in this disclosure, a "miscellaneous error" is an error that is neither a double post error nor a channel error. After double channel module 80 determines that the current chain includes a miscellaneous error, remediation alert module 82 may send a message to remediation system 12 that includes the current chain and a notification that the current chain includes a miscellaneous error (146).

Figure 7:
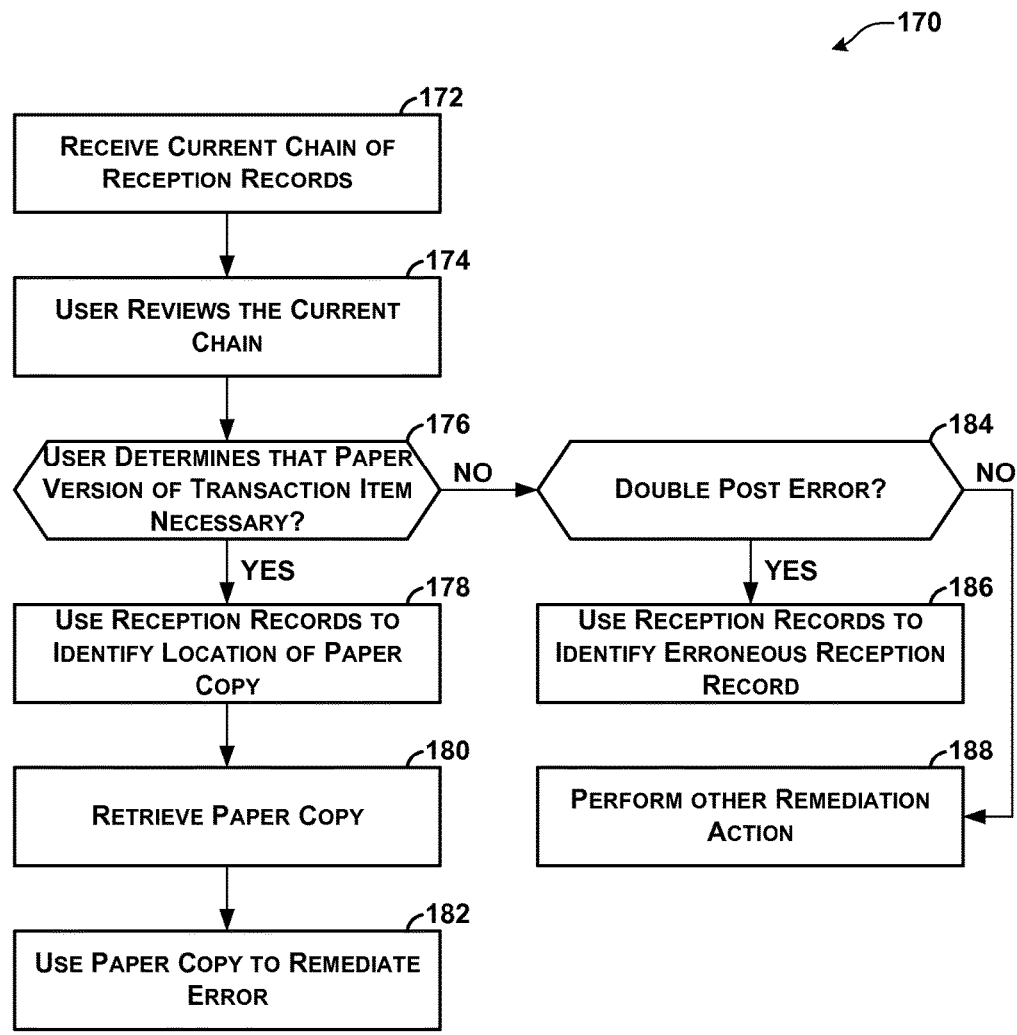
FIG. 7 is a flowchart illustrating an example operation of a remediation system.

FIG. 7 is a flowchart illustrating an example operation 170 of remediation system 12. As illustrated in the example of FIG. 7, a remediation process may begin when remediation system 12 receives a message from monitoring system 10 that specifies a chain of reception records for a transaction item and a type of error (172). For ease of explanation, this disclosure refers to the received chain of reception records in the context of FIG. 7 as the "current chain." After receiving the message, a user of remediation system 12 may review the current chain (174). In one instance, remediation system 12 may present the current chain on a user interface, thereby enabling the user of remediation system 12 to review the current chain.

After reviewing the current chain, the user of remediation system 12 may determine whether a paper copy of the transaction item is necessary to remediate the error in the current chain (176). The user of remediation system 12 may determine that a paper copy of the transaction item is necessary to remediate the error in the current chain in a variety of circumstances. For example, the user of remediation system 12 may determine that a paper copy of the transaction item is necessary to remediate the error when it appears likely that information in the electronic version of the transaction item was copied incorrectly from the paper version of the transaction item. In another example, the user of remediation system 12 may determine that a paper copy of the transaction item is necessary to remediate the error when an electronic version of the transaction item is corrupt.

If the user of remediation system 12 determines that a paper copy of the transaction item is necessary to remediate the error ("YES" of 176), the user of remediation system 12 may use the reception records in reception request database 70 to identify a location of the paper version of the transaction item (178). For example, a digital version of the transaction item may proceed along a first transaction channel and a paper version of the transaction item may proceed along a second transaction channel. In this example, if the user determines that a paper copy of the transaction item is necessary to remediate a error in a chain of reception receipts for the electronic version of the transaction item, the user may use remediation system 12 to retrieve a chain of reception records for the paper version of the transaction item. In this example, a node that generated the last reception record in the chain of reception records for the paper version of the transaction item is likely to still have physical custody of the paper version of the transaction item.

After the user uses the reception records in reception record database 8 to identify the location of the paper version of the transaction item, the user may retrieve the paper version of the transaction item from the identified location (180). The user may then use the paper version of the transaction item to remediate the error in the current chain (182). For instance, if the error was caused by a corrupted electronic version of the transaction item, the user may remediate the error by recreating the electronic version of the transaction item and forwarding the recreated electronic version of the transaction item to a next node in the transaction channel.

On the other hand, if the user determines that a paper version of the transaction item is not necessary to remediate the error in the current chain ("NO" of 176), remediation system 12 may determine whether the error is a double-post error (184). If the error in the current chain is a double post error, the current chain includes a reception record that corresponds to a reception record in the previous day's reception records. In one implementation, remediation system 12 may determine whether the error is a double-post error by determining whether a message from monitoring system 10 indicates that the error is a double-post error. If the error is a double-post error ("YES" of 184), the user of remediation system 12 may use the reception records to identify whether a reception record in the current day's reception records or a reception record in the previous day's reception records is erroneous (186). For instance, the user of remediation system 12 may determine that the reception record in the current chain is erroneous when the current chain only includes the reception record and the reception record was generated by a node in the middle of a transaction channel. If the error is not a double-post error ("NO" of 184), the user of remediation system 12 may perform some other action to remediate the error (188).

It should be noted that many other remediation processes are possible. For instance, in one remediation process, remediation system 12 may receive a multiple messages from monitoring system 10 that indicate errors in different chains of reception records. In this example, remediation system 12 may compare these errors to determine whether the errors are related and thereby remediate both of the errors.

Figure 8:
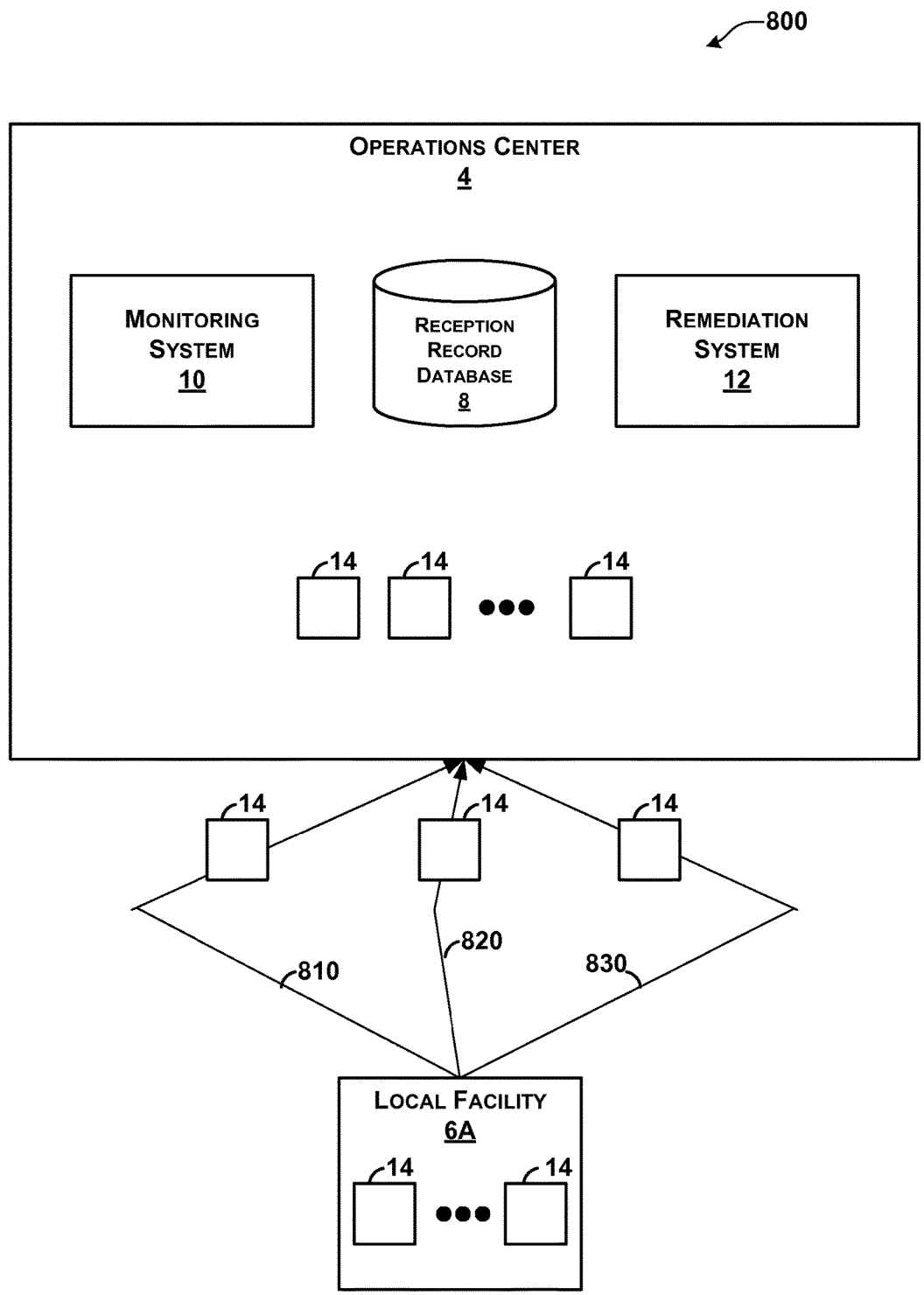
FIG. 8 is a block diagram illustrating another example system in which a financial institution uses automatic transaction monitoring to detect missing financial transactions.

FIG. 8 shows another example system 800 including a plurality of transaction channels 810, 820, 830 extending from the local facility 6A to the operations center 4. A transaction item can travel along one of the transaction channels 810, 820, 830 during execution. Each of the transaction channels 810, 820, 830 can include one or more nodes.

For example, a transaction involving a check can follow one of a plurality of transaction channels. One transaction channel includes an image capture of the check at the local facility and delivery of only the image to the operations center 4 for execution, while another transaction channel includes forwarding of the physical check to the operations center 4 for execution.

In example embodiments, the monitoring system 10 is programmed to track transactions along the plurality of transaction channels 810, 820, 830. For example, the monitoring system not only tracks transactions along the nodes of the transaction channel that a particular transaction item is expected to follow, but can also track the transaction item along nodes in other transaction channels if an error is made.

For example, if a transaction item is expected to travel along transaction channel 810, the monitoring system 10 can analyze the nodes of the transaction channel 810 and identify if the transaction item fails to make it to a particular node within a particular time period. The monitoring system 10 can also track the nodes associated with the other transaction channels 820, 830 to determine if the transaction item was erroneously introduced into the incorrect transaction channel.

Further, in some embodiments, the monitoring system 10 is programmed to determine when a node of one of the transaction channels 810, 820, 830 receives a transaction item that is not expected. During such an occurrence, the monitoring system 10 can analyze the characteristics of the transaction item and other transaction channels to determine if the transaction item was introduced into the incorrect transaction channel. Other configurations are possible.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes and instructions may be stored in computer-readable media and executed by processors. The memory unit may be implemented within the processor or external to the processor, in which case it can be communicatively coupled to the processor via various means as is known in the art.

The techniques described in this disclosure may provide several advantages. For example, errors are typically detected only when customers complain that transactions were not processed properly. The automatic monitoring system may detect errors before the customers are able to notice that the transactions were not processed properly to minimize the potential for no posts or double posts. Furthermore, the remediation process may correct these errors before the customers are able to notice that the transactions were not processed properly. This may lead to greater customer satisfaction and may enable the bank to comply with service-level agreements made with customers.

In an additional example advantage, the reception records may be used to find paper documents more quickly. Because the reception records indicate when the nodes receive transaction items, including paper transaction items, the reception records may be used to identify nodes that last received the paper transaction items. The nodes that last received the paper transaction items are likely to be the nodes that still have the paper transaction items.

Furthermore, the monitoring system may advantageously enable a financial institution that operates the transaction channels to determine where errors are most likely to occur within the transaction channels. For instance, the reception records may reveal that most errors occur because tellers at bank branches place transaction items into bins associated with the wrong type of transaction items. Because the financial institution is able to know where errors are occurring within the transaction channels, the financial institution may be able take steps to address the cause of the errors.

Various embodiments have been described. These and other embodiments are within the scope of the following claims.

What is claimed is:

1. A method comprising:
   generating, using a computer at a plurality of nodes that perform actions in a transaction channel, reception records that memorialize receptions by the nodes of transaction items that represent financial transactions, each of the reception records including:
      a transaction item identifier that uniquely identifies the transaction item,
      a node identifier that uniquely identifies the computer associated with the node that generated the reception record,
      a timestamp that identifies a time when the node received the transaction item,
      a transaction channel identifier that identifies the transaction channel, the transaction channel being a series of actions performed internally by a financial institution to execute the transaction represented by the transaction item at the financial institution, and
      a transaction expiration time that indicates an expiration time for the reception record,
      wherein a separate reception record is generated for each of the plurality of nodes in the transaction channel;
   storing, by an operations center computer, the reception records in a reception records database;
   updating, by the operations center computer, the reception records in the reception records database as the nodes receive and transmit the transaction items through the transaction channel;
   automatically analyzing, by the operations center computer, the reception records to determine whether a given node that performs one of the actions in the transaction channel failed to receive a target transaction item within an expected time, wherein an error has occurred when the given node failed to receive the target transaction item within the expected time, and wherein the target transaction item is one of the transaction items;
   performing a remediation process that attempts to remediate the error when the given node failed to receive the target transaction item within the expected time, wherein the remediation process includes determining whether the reception records are a duplicate of a reception record associated with a different transaction channel;
   receiving, at a local facility, a paper financial document that represents a target financial transaction;
   in response to receiving the paper financial document, generating, at the local facility, a digital version of the paper financial document that represents the paper financial document; and
   transmitting, via a computer network, the digital version of the financial document from the local facility to one of the nodes that performs the target financial transaction in response to receiving the digital version of the financial document,
   wherein the digital version of the financial document is the target transaction item.

2. The method of claim 1, wherein the target transaction item is a paper document.

3. The method of claim 1, wherein automatically analyzing the reception records comprises automatically analyzing the reception records such that it is determined that the given node failed to receive the target transaction item within the expected time a short time after the expected time has expired.

4. The method of claim 1, wherein automatically analyzing the reception records comprises:
   identifying a most-recently generated one of the reception records that memorializes a reception by one of the nodes of the target transaction item; and
   determining that the given node failed to receive the target transaction item when the expected time has passed after a time associated with the most recent one of the reception records.

5. The method of claim 4,
   wherein automatically analyzing the reception records further comprises identifying a chain of reception records for the target transaction item, wherein the most-recently generated one of the reception records is a last reception record in the chain of reception records; and wherein determining that the given node failed to receive the target transaction item comprises:
identifying an expiration time for the most-recently generated one of the reception records in the chain of reception records; and
determining that the given node failed to receive the target transaction item when a current time is later than the expiration time.

6. The method of claim 5,
wherein the method further comprises determining whether the reception records include a reception record generated on a previous day that corresponds to a reception record in the chain of reception records; and
wherein performing the remediation process comprises using the reception records to determine whether the reception record in the chain of reception records or the reception record generated on the previous day is erroneous.

7. The method of claim 1,
wherein the transaction channel is a first transaction channel;
wherein the plurality of nodes is a first plurality of nodes;
wherein the reception records constitute a first set of reception records; and
wherein the method further comprises:
automatically generating, at a second plurality of nodes that perform actions in a second transaction channel, a second set of reception records that memorialize reception by the nodes in the second plurality of nodes of transaction items that represent financial transactions; and
automatically analyzing the second set of reception records to determine whether a node in the second plurality of nodes received the target transaction item.

8. The method of claim 7, wherein performing the remediation process comprises performing the remediation process when the given node in the first plurality of nodes failed to receive the target transaction item within the expected time and when the node in the second plurality of nodes received the target transaction item.

9. The method of claim 1,
wherein generating the reception records comprises generating reception records that memorialize receptions by the nodes of digital versions of checks;
wherein automatically analyzing the reception records comprises automatically analyzing the reception records to determine whether the given node failed to receive a target digital version of a check within an expected time;
wherein performing the remediation process comprises:
locating a paper version of the check; and
using the paper version of the check to remediate the error.

10. The method of claim 1, wherein performing the remediation process comprises:
determining whether a paper version of the target transaction item is needed to remediate the error; and
using the reception records to locate the paper version of the target transaction item when it is determined that the paper version of the target transaction item is needed to remediate the error.

11. The method of claim 1,
wherein the transaction channel is a first transaction channel; and
wherein the method further comprises transmitting the paper financial document from the local facility through nodes that perform actions in a second transaction channel, wherein the nodes that perform the actions in the second transaction channel generate a second set of reception records that memorialize reception by the nodes that perform actions in the second transaction channel of transaction items that represent financial transactions.

12. The method of claim 1, further comprising storing the reception records in a database at an operations center.

13. An operations center computer system comprising:
one or more processors; and
instructions stored on computer-readable media, the instructions being executed by the processors to:
identify a transaction channel that comprises a sequence of actions required to process transaction items that represent financial transactions belonging to a type of financial transaction, the sequence of actions including:
receive a personal check;
create digital version of the personal check;
submit the digital version of the personal check to a check processing authority; and
archive the personal check;
define a plurality of nodes, each of which receives transaction items belonging to the type of financial transaction, generates a reception record that memorializes the reception of the transaction item upon receiving the transaction item, stores the reception record into a reception records database, performs at least one of the sequence of actions of the transaction channel, and forwards the transaction item to a one of the nodes that performs a next one of the actions of the transaction channel, the reception record including a transaction channel identifier that identifies the transaction channel, and a transaction expiration time that indicates an expiration time for the reception record;
define a final node that receives the transaction item from a node in the plurality of nodes and performs at least one of the actions of the transaction channel;
update the reception records in the reception records database as the plurality of nodes receives and transmits the transaction items through the transaction channel;
automatically analyze the reception records in the reception records database to determine whether a given node failed to receive a target transaction item,
wherein an error has occurred when the given node failed to receive the target transaction item before the expiration time for the reception record,
wherein the target transaction item belongs to the type of transaction items, and
wherein the given node is a node in the plurality of nodes or the final node; and
when a determination is made that the given node failed to receive the target transaction item: analyze the reception records in the reception records database to identify a reason why the given node failed to receive the target transaction item before the expiration time for the reception record,
wherein analyze the reception records in the reception records database to identify a reason further comprises determine whether the reception records are a duplicate of a reception record associated with a different transaction channel;

in response to receiving a paper financial document that represents a target financial transaction at a local facility, generating, at a local facility, a digital version of the paper financial document that represents the paper financial document; and transmitting, via a computer network, the digital version of the financial document from the local facility to one of the nodes that performs the target financial transaction in response to receiving the digital version of the financial document, wherein the digital version of the financial document is the target transaction item.

14. The system of claim 13, further comprising a remediation system that performs a remediation process that attempts to remediate the error when the given node failed to receive the target transaction item before the expiration time.

15. The system of claim 14, wherein the remediation system comprises a user interface that presents a chain of reception records to a user who manually reviews the chain of reception records to determine whether a paper version of the transaction item is necessary to remediate the error.

16. The system of claim 13, further comprising to determine whether the reason the given node failed to receive the target transaction item before the expiration time for the reception record is that a node received the target transaction item twice.

17. The system of claim 13, further comprising to determine whether the reason the given node failed to receive the target transaction item before the expiration time for the reception record is that the target transaction item was routed to an incorrect transaction channel.

* * * * *